(12) United States Patent
Ewing

(10) Patent No.: US 11,341,274 B2
(45) Date of Patent: May 24, 2022

(54) METHODS AND SYSTEMS FOR ACCESS CONTROLLED SPACES FOR DATA ANALYTICS AND VISUALIZATION

(71) Applicant: Elasticsearch B.V., Mountain View, CA (US)

(72) Inventor: Courtney Ewing, Lititz, PA (US)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 16/226,138

(22) Filed: Dec. 19, 2018

(65) Prior Publication Data
US 2020/0202020 A1 Jun. 25, 2020

(51) Int. Cl.
*G06F 21/62* (2013.01)
*G06F 21/60* (2013.01)
*G06F 21/31* (2013.01)
*G06F 9/451* (2018.01)
*H04L 29/06* (2006.01)

(52) U.S. Cl.
CPC ............ *G06F 21/629* (2013.01); *G06F 9/451* (2018.02); *G06F 21/31* (2013.01); *G06F 21/604* (2013.01); *H04L 63/102* (2013.01); *G06F 2221/2141* (2013.01)

(58) Field of Classification Search
CPC ........... G06F 2221/2141; G06F 21/629; G06F 9/451; G06F 21/31; G06F 21/604; H04L 63/102
See application file for complete search history.

(56) References Cited

U.S. PATENT DOCUMENTS

| 8,412,237 | B1 | 4/2013 | Ohme |
| 8,683,490 | B2 | 3/2014 | Endrikhovski et al. |
| 8,930,581 | B2 | 1/2015 | Anton et al. |
| 9,432,379 | B1 | 8/2016 | Roche et al. |
| 10,109,086 | B1 | 10/2018 | Bakshi et al. |
| 10,756,959 | B1 | 8/2020 | Makwarth et al. |

(Continued)

OTHER PUBLICATIONS

Ewing, Courtney, "Methods and Systems for Access Controlled Spaces for Data Analytics and Visualization," U.S. Appl. No. 16/226,138, filed Dec. 19, 2018, Specification, Claims, Abstract, and Drawings, 47 pages.

(Continued)

*Primary Examiner* — Matthew Ell
*Assistant Examiner* — David Tan
(74) *Attorney, Agent, or Firm* — Carr & Ferrell LLP

(57) ABSTRACT

Methods and systems for enabling organization and control of dashboards, visualizations, and other saved data objects into spaces. An exemplary method includes, based on at least one role of a user, controlling the user's access to a default space and to other spaces of a plurality of spaces, such that the only spaces that the user can access are the default space and the one or more other spaces. Each space can contain a number of saved objects such as dashboards, visualizations, or other objects. The method can provide a graphical user interface for enabling the user to select, as a current space, the default space or one of the other spaces; and in response to the selection, automatically saving new objects generated by the user into the current space; wherein each of the spaces is configured to provide access to certain data objects only or access to certain applications only.

19 Claims, 13 Drawing Sheets

(56) References Cited

U.S. PATENT DOCUMENTS

| | | | |
|---|---|---|---|
| 10,782,860 B2 | 9/2020 | Neirynck | |
| 11,240,126 B2 | 2/2022 | Makwarth et al. | |
| 2004/0054723 A1 | 3/2004 | Dayal et al. | |
| 2004/0267600 A1 | 12/2004 | Horvitz | |
| 2005/0216865 A1 | 9/2005 | Rollin et al. | |
| 2006/0117390 A1 | 6/2006 | Shrivastava et al. | |
| 2006/0224989 A1 | 10/2006 | Pettiross et al. | |
| 2007/0124374 A1 | 5/2007 | Arun et al. | |
| 2007/0226204 A1* | 9/2007 | Feldman | G06F 16/30 |
| 2008/0120565 A1 | 5/2008 | Stiso et al. | |
| 2008/0243766 A1 | 10/2008 | Nowlan et al. | |
| 2009/0027418 A1 | 1/2009 | Maru et al. | |
| 2009/0175509 A1 | 7/2009 | Gonion et al. | |
| 2010/0070448 A1 | 3/2010 | Omoigui | |
| 2011/0023082 A1 | 1/2011 | Narasinghanallur et al. | |
| 2011/0153186 A1 | 6/2011 | Jakobson | |
| 2011/0208766 A1 | 8/2011 | Lang | |
| 2011/0261049 A1 | 10/2011 | Cardno et al. | |
| 2013/0127877 A1 | 5/2013 | Blas, Jr. et al. | |
| 2013/0254699 A1* | 9/2013 | Bashir | G06F 3/0481 715/772 |
| 2013/0346367 A1 | 12/2013 | Trugman et al. | |
| 2014/0082093 A1* | 3/2014 | Savage | H04L 41/50 709/206 |
| 2014/0109193 A1 | 4/2014 | Desai et al. | |
| 2014/0125672 A1 | 5/2014 | Winternitz et al. | |
| 2014/0181222 A1* | 6/2014 | Geris | H04L 51/24 709/206 |
| 2014/0215443 A1 | 7/2014 | Voccio et al. | |
| 2014/0250234 A1 | 9/2014 | Liesche et al. | |
| 2014/0365511 A1* | 12/2014 | Burrows | G06F 16/335 707/754 |
| 2014/0379648 A1* | 12/2014 | Chiu | G06F 16/178 707/624 |
| 2014/0380237 A1 | 12/2014 | Kroupa et al. | |
| 2015/0007252 A1 | 1/2015 | Kazachkov et al. | |
| 2015/0009234 A1 | 1/2015 | Johnson et al. | |
| 2015/0026208 A1 | 1/2015 | Kuhmuench | |
| 2015/0070351 A1 | 3/2015 | Tarquini et al. | |
| 2015/0127637 A1 | 5/2015 | Cavanagh et al. | |
| 2015/0220594 A1 | 8/2015 | Leyba | |
| 2015/0269499 A1* | 9/2015 | B | G06Q 10/063 705/7.42 |
| 2015/0363733 A1* | 12/2015 | Brown | G06Q 10/10 705/7.26 |
| 2015/0370839 A1 | 12/2015 | Bareket et al. | |
| 2016/0011751 A1 | 1/2016 | Moses et al. | |
| 2016/0057159 A1 | 2/2016 | Yin et al. | |
| 2016/0182328 A1 | 6/2016 | Bhasin et al. | |
| 2016/0188663 A1 | 6/2016 | Tsumura et al. | |
| 2016/0241676 A1 | 8/2016 | Armstrong et al. | |
| 2016/0283085 A1* | 9/2016 | Beausoleil | G06F 40/186 |
| 2017/0075919 A1* | 3/2017 | Bose | G06F 21/00 |
| 2017/0147790 A1 | 5/2017 | Patel et al. | |
| 2017/0169611 A1* | 6/2017 | Ramirez Flores | A63F 13/26 |
| 2017/0295018 A1 | 10/2017 | Whitehouse | |
| 2017/0346862 A1* | 11/2017 | Hanhirova | H04L 63/102 |
| 2017/0359346 A1 | 12/2017 | Parab et al. | |
| 2018/0060361 A1 | 3/2018 | Beveridge | |
| 2018/0062955 A1 | 3/2018 | Broda et al. | |
| 2018/0113891 A1* | 4/2018 | Jaskiewicz | G06F 16/21 |
| 2018/0121082 A1 | 5/2018 | Zhu et al. | |
| 2018/0150384 A1 | 5/2018 | Alaranta et al. | |
| 2018/0232194 A1 | 8/2018 | Chen | |
| 2018/0239658 A1 | 8/2018 | Whitner et al. | |
| 2018/0270122 A1 | 9/2018 | Brown et al. | |
| 2018/0276266 A1 | 9/2018 | Diwakar | |
| 2018/0287856 A1 | 10/2018 | Whitner et al. | |
| 2019/0020659 A1 | 1/2019 | Loni et al. | |
| 2019/0057534 A1 | 2/2019 | Henry et al. | |
| 2019/0138995 A1 | 5/2019 | Currin et al. | |
| 2019/0229922 A1 | 7/2019 | Galloway | |
| 2019/0272085 A1* | 9/2019 | Radhakrishnan Lakshmi | G06F 3/0486 |
| 2019/0317754 A1 | 10/2019 | Mosquera et al. | |
| 2019/0354835 A1 | 11/2019 | Mac et al. | |
| 2019/0377887 A1 | 12/2019 | Bedi et al. | |
| 2020/0021505 A1 | 1/2020 | Vinnakota et al. | |
| 2020/0036522 A1 | 1/2020 | Willnauer | |
| 2020/0133550 A1 | 4/2020 | Willnauer | |
| 2020/0134750 A1 | 4/2020 | Wolf et al. | |
| 2020/0184090 A1 | 6/2020 | Grand | |
| 2020/0272307 A1 | 8/2020 | Neirynck | |
| 2020/0296110 A1 | 9/2020 | Kobel et al. | |
| 2020/0328952 A1 | 10/2020 | Makwarth et al. | |
| 2021/0124478 A1 | 4/2021 | Reese et al. | |

OTHER PUBLICATIONS

Willnauer, Simon Daniel, "Default Password Removal," U.S. Appl. No. 16/047,959, filed Jul. 27, 2018, Specification, Claims, Abstract, and Drawings, 37 pages.

Seifermann, Valentin, "Application Performance Monitoring in Microservice-Based Systems," Institute of Software Technology—Reliable Software Systems, University of Stuttgart, 2017; 85 pages.

Hinterreiter, Daniel, "Supporting feature-oriented development and evolution in industrial software ecosystems", Proceedings of the 22nd International Systems and Software Product Line Conference—vol. 2, Sep. 10-14, 2018, 8 pages.

Kuhlmann, Mirco et al., "Comprehensive Two-level Analysis of Static and Dynamic RBAC Constraints with UML and OCL", 2011 Fifth International Conference on Secure Software Integration and Reliability Improvement, pp. 108-117. IEEE, 2011, 10 pages.

Grand, Adriend, "Document-Level Attribute-Based Access Control," U.S. Appl. No. 16/212,475, filed Dec. 6, 2018, Specification, Claims, Abstract, and Drawings, 37 pages.

Zhang et al., "EnjoyPhoto: a vertical image search engine for enjoying high-quality photos." In Proceedings of the 14th ACM international conference on Multimedia, pp. 367-376. Oct. 23-27, 2006.

Pham et al., "Feature-reduction fuzzy co-clustering algorithm for hyperspectral image segmentation." In 2017 IEEE International Conference on Fuzzy Systems (FUZZ-IEEE), pp. 1-6. IEEE, 2017.

Elasticsearch security privileges guide ("guide"), eslatic.co/guide/en/elasticsearch/reference/master/security-privileges.html, Jun. 23, 2017, 7 pages.

\* cited by examiner

```
┌─────────────────────────────────────────┐
│ Based on at least one role of the user, │
│ automatically controlling access to the │
│ user to a default space and to other    │
│ spaces of a plurality of spaces, each   │
│ space containing a number of saved      │
│ objects, the saved objects being        │
│ dashboard, visualizations, or other     │
│ objects.                                │
│                  1202                   │
└─────────────────────────────────────────┘
                    │
                    ▼
┌─────────────────────────────────────────┐
│ Providing a user interface for enabling │
│ the user to select, as a current space, │
│ the default space or one of the other   │
│ spaces.                                 │
│                  1204                   │
└─────────────────────────────────────────┘
                    │
                    ▼
┌─────────────────────────────────────────┐
│ In response to the user selecting the   │
│ current space, automatically saving new │
│ objects generated by the user into the  │
│ current space.                          │
│                  1206                   │
└─────────────────────────────────────────┘
                    │
                    ▼
┌─────────────────────────────────────────┐
│ Wherein each of the one or more other   │
│ spaces is organized and configured to   │
│ provide access to certain data objects  │
│ only or access to certain applications  │
│ of a plurality of applications only     │
│                  1208                   │
└─────────────────────────────────────────┘
```

FIG. 12

METHODS AND SYSTEMS FOR ACCESS CONTROLLED SPACES FOR DATA ANALYTICS AND VISUALIZATION

FIELD

The present technology pertains in general to data visualization and more specifically, to providing spaces configurable for access control for various data analysis, visualization, and exploration.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for providing spaces (also referred to as workspaces) configurable for various data visualization and analysis. Various embodiments enable the organizing and access controlling of dashboards, visualizations, and other saved data objects into spaces that are containers An exemplary computer-implemented method includes providing a user interface for enabling the user to select, as a current space, a default space or one of one or more other spaces of a plurality of spaces; and in response to the user selecting the current space, automatically saving new objects generated by the user into the current space; wherein each of the one or more other spaces is organized and configured to provide access to certain data objects only or access to certain applications of a plurality of applications only. In some embodiments, the method further includes, based on at least one role of the user, automatically controlling access to the user to the default space and to the one or more other spaces of a plurality of spaces, such that the only ones of the plurality of spaces that the user can access are the default space and the one or more other spaces.

One of the many advantages of various embodiments of the present technology is that spaces need not be organized by teams, but instead can be organized by common purpose. In addition, access can be controlled to limit a user's access to certain applications. In addition, an example method can automatically generate a default space for a user; and automatically place some or all of the user's saved data objects that existed before the default space was generated, into the default space. In some embodiments, each of the plurality of spaces is independent, such that the saved objects unique to one of the spaces do not appear in any of the other ones of the plurality of spaces. The method can further provide a user interface for selectively deleting a first space of the plurality of spaces, wherein in response to the selectively deleting, the deletion selection is cascaded to all saved objects within the first space.

BRIEF DESCRIPTION OF THE DRAWINGS

Embodiments are illustrated by way of example, and not by limitation, in the figures of the accompanying drawings, in which like references indicate similar elements and in which:

FIG. 5 illustrates an example user interface for managing workspaces, according to an example embodiment.

FIG. 8 illustrates an example UI for creating a role with full access to all spaces, according to an example embodiment.

FIG. 9 illustrates an example UI for creating a role with read-only access to all spaces with full access to only a selected space, according to an example embodiment.

FIG. 12 is a simplified flow diagram of a method, according to an example embodiment.

DETAILED DESCRIPTION

Figure 1:
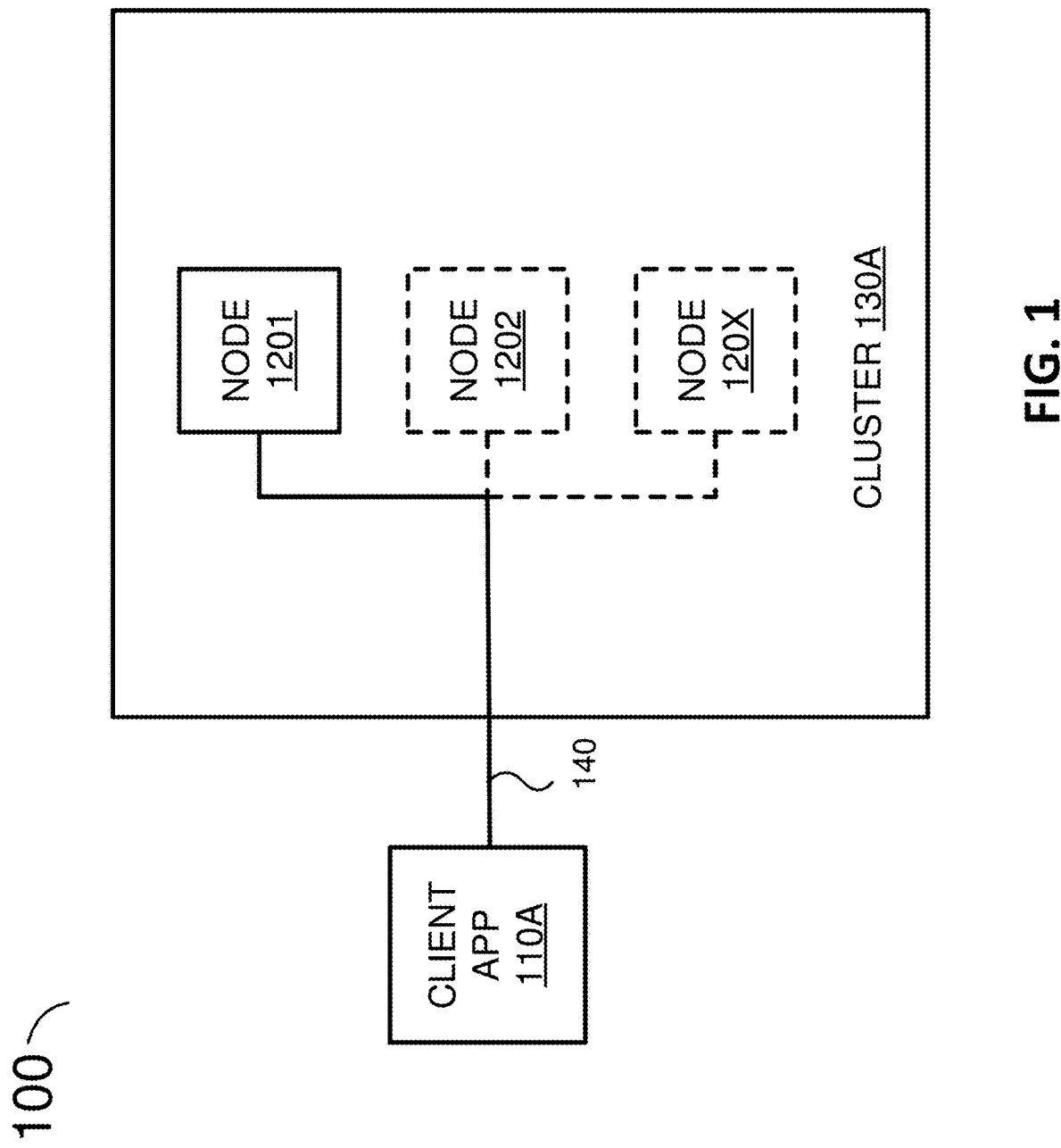
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for providing spaces configurable for various data visualization, analysis and exploration.

FIG. 1 is a simplified diagram illustrating a system 100 to illustrate certain concepts of the distributed nature and distributed application structure, according to some embodiments. System 100 includes client application 110A, one or more nodes 120₁-120X, and connections 140. Collectively, one or more nodes 120₁-120X form cluster 130A. When only one node (e.g., node 120₁) is running, then cluster 130A is just one node. In various embodiments, a cluster (e.g., cluster 130A) is a collection of one or more nodes (servers) (e.g., one or more nodes 1201-120X) that together store data and provides federated indexing and search capabilities across all nodes. A cluster can be identified by a unique name, such that a node can be part of a cluster when the node is set up to join the cluster by its name. A cluster may have only one node in it. In some embodiments, a node (e.g., one or more nodes 1201-120X) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster. In some embodiments, nodes (e.g., one or more nodes 1201-120X) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 110A) requests to the appropriate node. Each node can serve one or more purposes, master node and data node.

Each of client application 110A and one or more nodes 1201-120X can be a container, physical computing system, virtual machine, and the like. Generally, client application 110A can run on the same or different physical computing system, virtual machine, container, and the like as each of one or more nodes 1201-120X. Each of one or more nodes 1201-120X can run on the same or different physical computing system, virtual machine, container, and the like as the others of one or more nodes 1201-120X. A physical computing system is described further in relation to the exemplary computer system 1300 of FIG. 13. Virtual machines may provide a substitute for a physical computing system and the functionality needed to execute entire operating systems.

When client application 110A runs on a different physical server from a node (e.g., of one or more nodes 1201-120X), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes 1201-120X) runs on a different physical computing system from another node (of one or more nodes 1201-120X), connections 140 can be a data communications network. Further details regarding the distributed application structure can be found in commonly assigned U.S. patent application Ser. No. 16/047,959, filed Jul. 27, 2018 and incorporated by reference herein.

Having provided the above details of certain concepts of the distributed application structure described above, the description now turns to further detailing aspects of the present technology according to various embodiments.

Although various example embodiments are described herein with respect to KIBANA and other elements of an integration solution called ELASTIC STACK, the present technology is not so limited.

KIBANA provides for data visualization and exploration, for example, for log and time-series data analytics, application monitoring, and other use cases regarding a user's data on its servers, cloud-based services used, etc.

Figure 2:
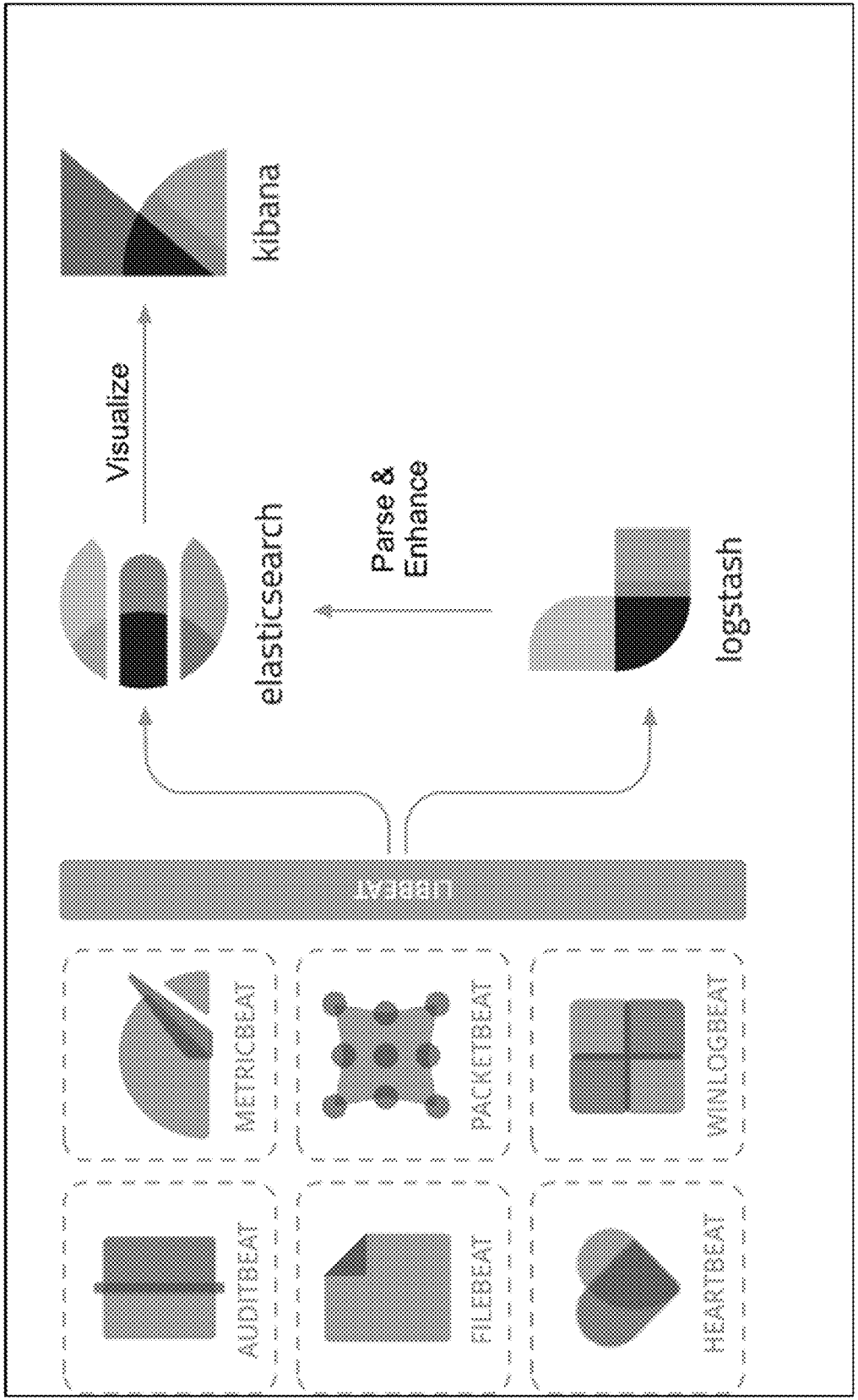
FIG. 2 is an example diagram illustrating various aspects and process flow, according to example embodiments.

FIG. 2 is an example diagram of a system 200 illustrating KIBANA connections and flow with respect to other aspects of an integrated solution referred to as ELASTIC STACK. BEATS can capture various items including but not limited to audit data (AUDITBEAT), log files (FILEBEAT), availability (HEARTBEAT), metrics (METRICBEAT), network traffic (PACKETBEAT), and windows event logs (WINLOGBEAT). BEATS can send data directly into ELASTICSEARCH or via LOGSTASH (a data-collection and log-parsing engine) where it can be further processed and enhanced before visualizing, analyzing and exploring it using KIBANA). Although FIG. 2 includes KIBANA and other particular aspects and components, the present technology is not limited to utilizing some or all of the components and aspects.

KIBANA can provide a powerful and easy-to-use visual interface with features such as histograms, line graphs, pie charts, sunbursts and the can enable a user to design their own visualization, e.g., leveraging the full aggregation capabilities of the ELASTICSEARCH (a distributed, multi-tenant-capable full-text analytics and search engine). In that regard, KIBANA can provide tight integration with ELASTICSEARCH for visualizing data stored in ELASTICSEARCH. KIBANA may also leverage the Elastic Maps Service to visualize geospatial data, or get creative and visualize custom location data on a schematic of the user's choosing. Regarding time series data, KIBANA can also perform advanced time series analysis on a company or other user's ELASTICSEARCH data with provide curated time series user interfaces (UI)s. Queries, transformations, and visualizations can be described with powerful, easy-to-learn expressions. Relationships can be analyzed with graph exploration.

With KIBANA, a user may take the relevance capabilities of a search engine, combine them with graph exploration, and uncover the uncommonly common relationships in the user's ELASTICSEARCH data. In addition, KIBANA can enable a user to detect the anomalies hiding in a user's ELASTICSEARCH data and explore the properties that significantly influence them with unsupervised machine learning features. A user could also, e.g., using CANVAS, infuse their style and creativity into presenting the story of their data, including live data, with the logos, colors, and design elements that make their brand unique. This covers just an exemplary subset of the capabilities of KIBANA.

Some embodiments provide for the user to share visualizations and dashboards (e.g., KIBANA or other visualizations and dashboards), with others, e.g., a user's team members, the user's boss, their boss, a user's customers, compliance managers, contractors, while having access controlled.

Various embodiments of the methods and systems of the present technology enable a user to organize their dashboards and visualizations into spaces, e.g., KIBANA spaces. In various embodiments, a user can invite other users into certain spaces (and not others) using role-based access control or attribute-based access control. Spaces can allow users to organize their dashboards, visualizations, and other saved objects into meaningful categories based on team, use case, individual, etc. Using role-based access control, security can be layered in to control who can (and cannot) view and/or edit which space. If an organization has a shared KIBANA instance with hundreds of dashboards and visualizations, for example, spaces can allow the organization to deliver a more organized and secure experience to the end users. Spaces can also be configured to not allow certain applications to be used in the particular space as will be described further herein.

Figure 3:
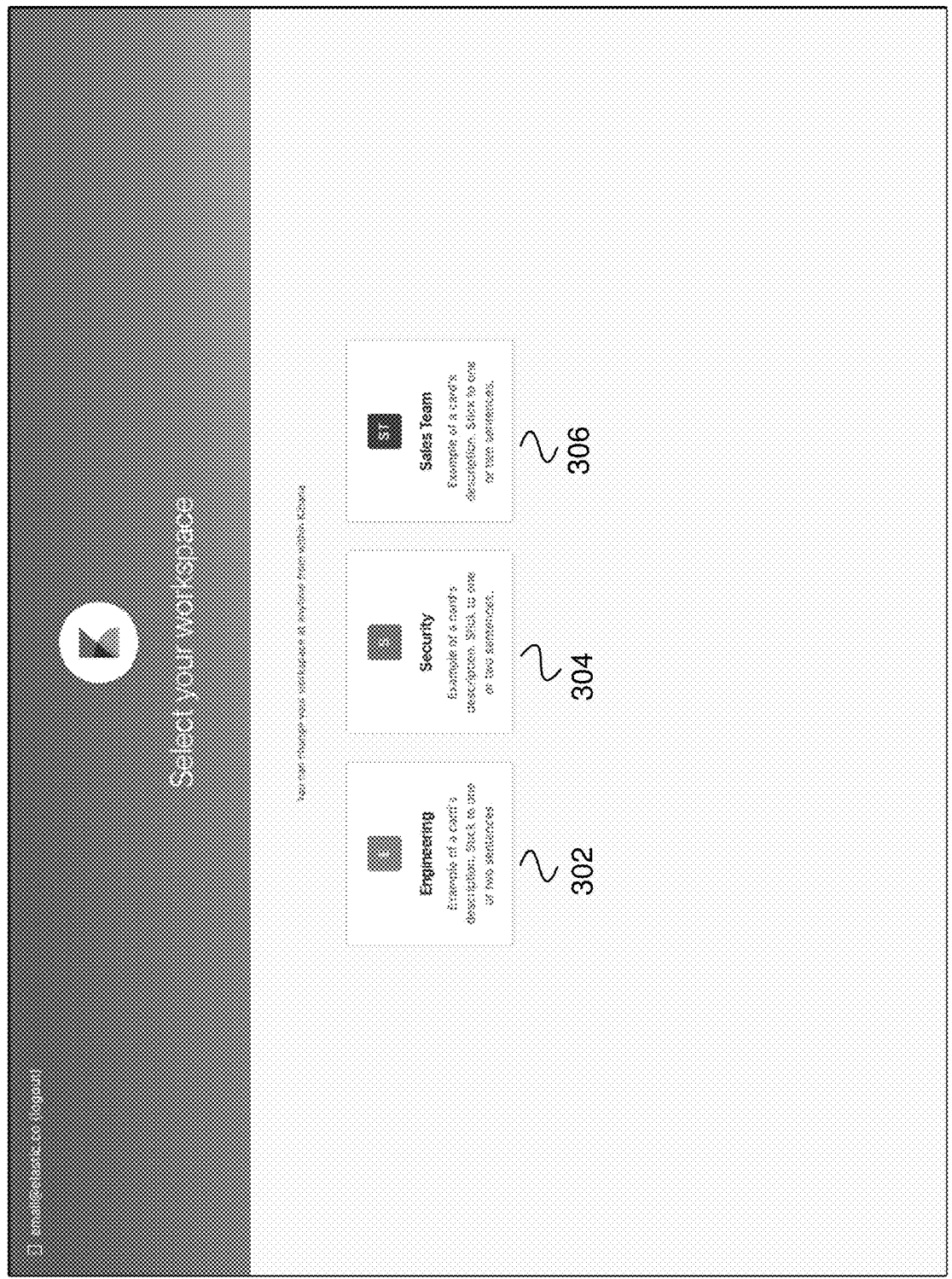
FIG. 3 is an example user interface showing multiple selectable spaces for a user.

Each space can be a secure container for a user to put in many different saved objects in KIBANA—dashboards, visualizations, saved objects, index patterns (to indicate which search engine indices a user wants to explore), advance settings, timeline expressions, etc. that would normally get bundled into one KIBANA index with access to everyone. These spaces can be isolated into individual containers in the UI. This can allow a user to do any sort of grouping they desire, FIG. 3 is an example user interface 300 showing multiple selectable spaces for a user. In this example, there is an Engineering team 302, a Security team 304, and a Sales team 306 which the user is allowed to choose (e.g., space chooser). Administrators or others can setup these spaces.

When a user logs in, if it is determined that the user's role(s) and/or attribute(s) has access to the particular space, then the method and system can prompt the user with the ability to select that space. In the example in FIG. 3, an interface may be presented when a user logs in which shows certain selectable spaces that the user can access. More specifically, the user is prompted with the Engineering space 302, Security space 304 and Sales team space 306 from which the user can make a selection. This, in effect, can transform the experience of interacting with the visualization platform to tailor it for the particular spaces. The user logging in and seeing the user interface 300 may only see applications that are associated the three spaces, 302, 304, and 306. For example, if the user selects the sales team's space 306, that space 306 may be configured to provide access only to certain data objects and to certain applications associated with the sales team space 306. In this example, the user selecting the sales team space 306 can only see the dashboards, visualizations, and index patterns associated with that particular space. Index patterns can be patterns regarding how to query and where to query the search engine for data.

The particular spaces that a user can select can be determined by an administrator based on the user's roles and/or attributes. If the methods and systems according to various embodiments determine that the user does not have access to a particular space, then that particular space will not be visible or selectable by the user in the UI, e.g., the user will not see it and won't even know the other spaces exist or the existence of saved objects within those other inaccessible spaces.

Each space may be independent in the sense that objects unique to a first space do not appear in a different, second space.

In some embodiments, a dashboard only mode is configurable on a space by space basis. For example, one of the selectable spaces may be configured to provide a dashboard-only mode, where based on the role and/or attributes of a particular user, that particular user may only be given read only access to marketing dashboards and operational dashboards, while other selectable spaces may be configured to provide fuller access.

In various embodiments, many discrete sets of data can be made secure from each other. In an example common use case, it may be desired to have read only access to KIBANA and to also have many discrete sets of data that are secure from each other. To achieve this prior to the present technology, a large number of KIBANA instances would have to be deployed and managed separately which can be burdensome and cumbersome. In various embodiments, the user need not have to do that in order to manage, e.g., discrete data sets, etc.

The ability can be provided to select which space is a default space. For the default space, in response to the user logging in, the system can immediately drop the user into a particular default space. For example, a user on the engineering team, may want to always be logged into the engineering space first and just have the option to switch to the other ones if the user desires.

Figure 4:
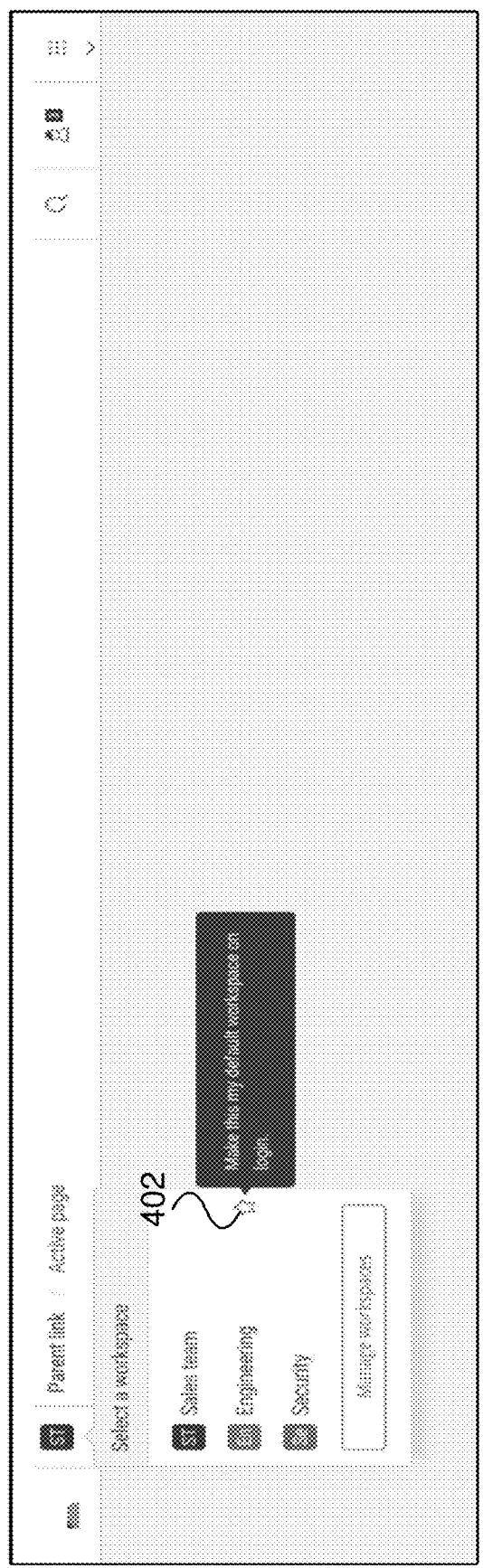
FIG. 4 illustrates an example user interface for displaying selectable spaces and the predetermined default login space, according to an example embodiment.

FIG. 4 illustrates an example user interface for displaying selectable spaces and the predetermined default login space, according to an example embodiment. In this example, the predetermined default login space is the Engineering space. In some embodiments, an indicator 402 of the selected space (e.g., Engineering space selected as default) and a selection menu of other accessible spaces is displayed via a navigation bar.

As described herein, the methods and systems in various embodiments provide the spaces functionality in such a way to enable a user to incrementally begin using spaces for their saved objects, and incrementally add security aspects, described herein. In various embodiments, a user on the search engine platform who is new to the spaces functionality can take advantage of the capability of spaces without any migration or backwards compatibility impediments.

Regarding the default space, the methods and systems in various embodiments will put saved objects that were created before the spaces feature was enabled, into the default space. In various embodiments, the default space is where saved objects that were created before spaces are enabled will go; and where dashboards, visualizations, etc. that are imported via BEATS will be created, until their workflows are augmented to allow the user to choose a space. An optional/space/path if present, is modified and if not present, a default space will be used. For example, uniform resource locators (URLs) for saved objects that were created before the spaces functionality was enabled will work, in various embodiments, as long as the respective saved object continues to exist within the default space. In some embodiments, if the saved object is moved to another workspace, in various embodiments the previous URLs (including short URLs) will no longer work and the user will get an error message.

Further regarding the provided seamless transition default space, in various embodiments, when a user creates a data object in the space, for example a user creates a dashboard within the engineering space, some changes are applied to the underlying data model for that dashboard. The identifier for the space can be stored on the saved object, e.g., the dashboard in this example. All objects in the default space have no identifier, according to various embodiments. The absence of any sort of space identified can then indicate that the saved object actually belongs to the default space. Thus, when a user updates to add the spaces functionality, all of the user's existing saved objects that the user might have previously created are now actually inside this default space that the user can select like any other space. Thus in various embodiments, a user's whole existing installation is essentially the default space which that user can just add on to.

In some embodiments, the URL that the user will see in a browser user interface implementation will also include the unique space identifier for that space in the URL. The URL may further include an identifier for the associated dashboard being accessed. Various embodiments allow the user to choose to take saved objects from a space and add them to a different space, unless access control security may otherwise limit the transfer.

In various embodiments, a user can choose to have access control security, as described herein, for their new spaces, providing an incremental and gradual way to adopt spaces within an organization without having to start over or do some huge migration of their existing data objects, e.g., already in KIBANA.

In another example, if the user was a salesperson and the only space the user had access to was the sales team space, e.g., 306, the salesperson would be brought directly to that space on login.

In some embodiments, the methods and systems enable a user and organization to organize spaces not so much around teams, but instead around a purpose within the company. For example, data around the company's public website if anyone is interested to run that data; data could be around all of the activity for their GitHub repositories, to name a few examples.

Data can be existing saved objects on the platform such as visualizations, dashboards and index patterns (a way to cache configuration details about how one searches for data). Data can also be another type including data ingested into ELASTICSEARCH and are performing search requests against it. This other type of data could be log data, ingesting GitHub activity, to name a few. In various embodiments, a user is not forced to restrict access to their own data of this other type. So, for example, using access control security, various embodiments enable restricting access to dashboards and other saved objects outside the space boundary; and theoretically, a user could simultaneously be given permission in ELASTICSEARCH, for instance, to search all of the user's own data including logs, etc. This means that in various embodiments, the access control for spaces (and saved objects therewithin) is not coupled to access control on the user's own data that the user is ingesting into ELASTICSEARCH and trying to analyze. On the other hand, the role based access control can be configured in such a way that a user only has access to the engineering space and only has access to the data in ELASTICSEARCH that is relevant to the engineering space.

For example, the engineering and security teams might be interested in the same raw log data, but for different reasons (e.g., debugging and security anomaly detection). In various embodiments, a dashboard related to the log data cannot exist in both the engineering space and the security space. Theoretically, there could be two distinct dashboards, however, one in the engineering space and the other in the security space where although the dashboards are distinct saved objects, each dashboard can create the same visualization in two different spaces and each dashboard's query, can make the same request to the search engine. That configuration of dashboards is theoretically possible even though there may not be in some embodiments an explicit sharing mechanism on the underlying dashboard saved object to indicated belonging to multiple spaces.

It should be clear that in various embodiments, the present technology goes far beyond merely having a feature where, for example, the security team gets their own space to put objects into and the sales team gets their own space. Among other things described herein, spaces in various embodiments are not necessarily team specific and instead are inherently flexible enough to be team oriented if the user desires (along with providing all the associated functionality discussed herein) or the spaces can be configured in a totally different and unique way to organize an organization's data. Spaces can be configured according to whatever common thread or purpose binds different individuals or teams. For one of the many examples further described herein, a production website could create their own space for which there could be a dozen teams having access to that space. The security team may want to access the website space because they are using a machine learning application within that space to identify anomalies in traffic to the website, e.g., to prevent denial of service (DOS) attacks, etc. Other teams may be given access to the production website space because they have other specific things they may want to do with that data, to organize for their particular analysis purposes. The sales team might want access to the production website space since they may be interested in knowing which countries get the most traffic on the website, to track like a sales funnel. Other teams may have other use cases for features for the data at the production website space and rather than inefficiently separating those features across several teams, a user could put them all in one space for the production website. Each organization can be different insofar as how it organizes its workflow, and spaces can help enhance people's workflows, e.g., across teams, having commonality in teams, or commonality in purposes, etc.

Certain aspects such as, for example, machine learning (ML), application performance monitoring (APM), other monitoring, and reporting may exist outside of the context of spaces, and continue to use cluster-wide settings and indices. These particular applications may include an indicator signifying that those particular applications are not within a space, so the user is aware that those particular applications are available cluster-wide. In some embodiments, a space may be exposed on a request from an ML application so the ML application can read the objects within that space.

Certain saved objects can exist within a single space. In some embodiments, sharing is not permitted between multiple workspaces.

Figure 5:
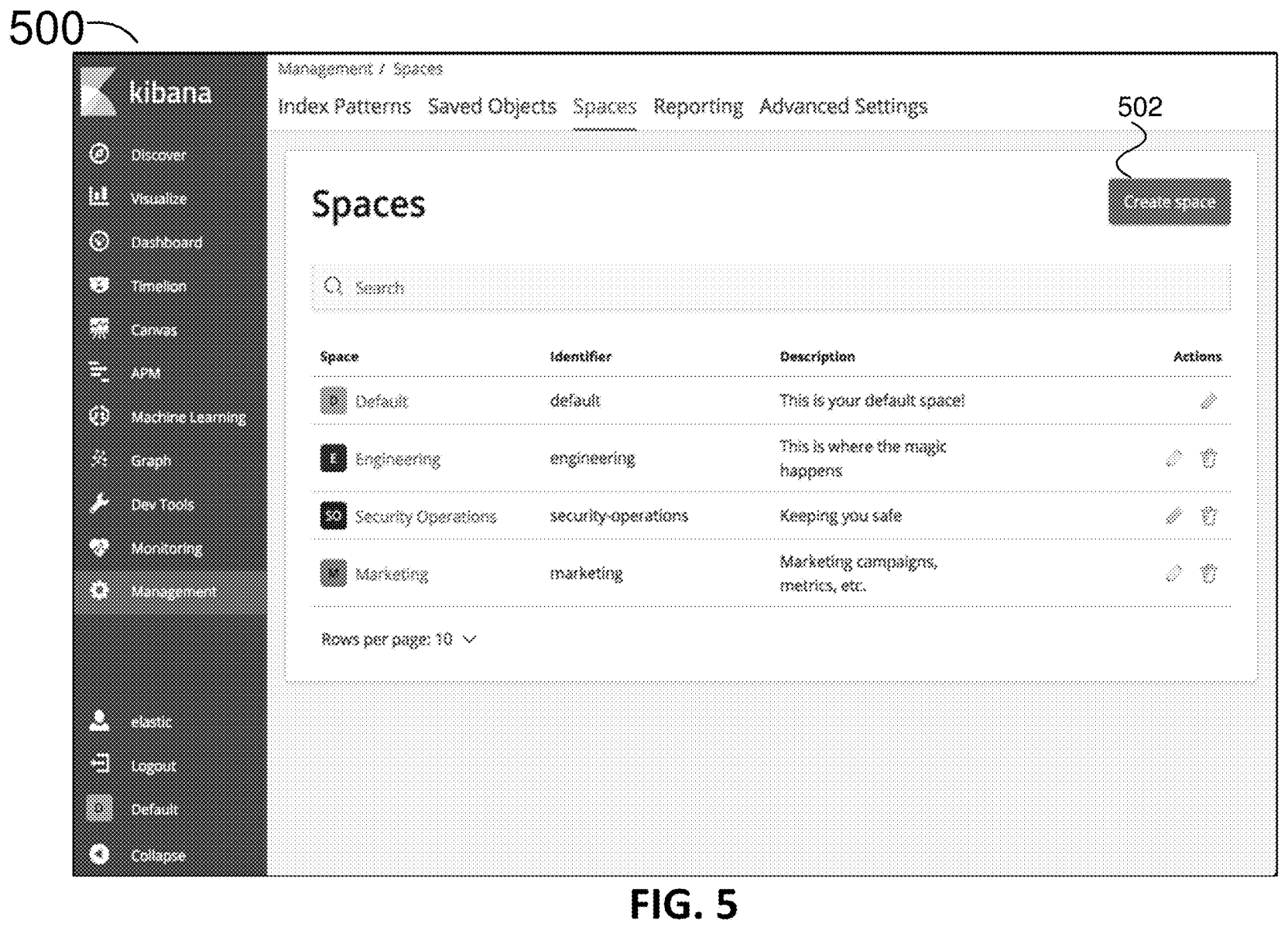

FIG. 5 illustrates an example user interface 500 for managing spaces, according to an example embodiment. Various embodiments provides for enabling a systems administrator, for example, to do certain managing of the spaces, e.g., Create/Read/Update/Delete (CRUD) operations, e.g., creating spaces, reading spaces, updating spaces, and deleting spaces.

In some embodiments, in response to a space being deleted, the deletion is cascaded to all saved objects within the space. Additionally, user interface settings can be space specific, and the settings from the default space are copied to the new space when it's created, according to various embodiments. Based on roles and/or attributes, read-only/write access can be granted to different spaces.

In some embodiments, in response to saved objects being exported, e.g., outside the system, the space in which they currently belong is omitted. In response to object being imported, the imported objects may be assigned to the currently selected space.

According to another example, there may be a sales team, an operations team, and a security team. These teams may differ in how they visualize data and in which data they care about, e.g., the sales team may not care about the log data that the operations team is aggregating and the operations team may not have the need for access to sales data. Various embodiments answer the question who can do what and who has access to what set of features and the underlying data models that empower them. For example, an organization may have organizational concerns regarding who can do what and who has access to what set of features and the underlying data models that empower them. Various embodiments can address these organizational concerns.

For a very small number of people in the entire group, access control may not be an issue, but it certainly is where there is a team of people or multiple teams that want to access only certain particular dashboards, access only certain visualizations, and/or access only certain index patterns which describe, for example, how to query and where to query the search engine for data.

Although some examples have been given for teams, some uses are not team oriented. For example, a company or user may want to have a number of different data sets that are all related to their production website. The company is keenly interested in keeping the website up and running, not buggy, etc. All of the data sets pertaining to the production website and all of the dashboards, visualizations, index patterns, CANVAS work pads, etc. may be organized into a workspace. In addition, separate groups may want their own workspaces for their data, separate and apart from other groups. Access control security permissions can be set up to determine who can access what workspaces.

In some embodiments, methods and systems allow the user to customize which applications are available to users, by controlling access on a space by space basis. For example, it can be determined that the sales team should not have access to the CANVAS application at all. This may occur, for example, when it is clear that a particular team's (e.g., the sales team) data is not CANVAS related, and that team should be constrained to a certain set of dashboards, for example, that have been created. In some embodiments, that particular team would not even be given access to the features of certain applications, e.g., CANVAS, to take advantage of when the sales team is within their sales space. This can provide more control and prevent unnecessary or undesirable use of certain applications by certain teams.

A production website is another example, which is not team specific, because there are multiple teams that need access to the data, but if it may not be desired and/or needed for the production website data to take advantage of a code search product. Since in this example, if the code search product is not important for the production website data, then that code search application can be removed entirely from the production website space. As a result, those having access to the production website space cannot use the code search product within that space, according to various embodiments. That way, the application may not be an impediment to the production website data development, and not make the space include unneeded applications that can cause inefficiency or complications since they are not needed and should not be used for that space.

In some embodiments, for security reasons, access control is enforced such that a user cannot circumvent spaces and access a dashboard directly, e.g., at the application programming interface (API) level, that the user cannot access in spaces. In various embodiments, access control would have to give the user access, based on roles and/or attributes for the user, to the space to which the particular dashboard belongs in order for the user to retrieve that dashboard or interact with its data.

The spaces functionality may be at the API level or the user interface level in some embodiments.

In various embodiments, role management provides the ability to apply access control on top of spaces with defined security boundaries around those spaces. An administrator can select which roles would only be able to access the objects that are within a particular space. In various embodiments, underlying methods and systems determine which spaces are presented to a particular user for selection, based, for example, on a user's attributes and/or roles. For example, to view a person's private health information, a number of conditions must be met to include a recent, valid Health Insurance Portability and Accountability Act (HIPAA) training certificate. Since everyone can take the training on different dates, no single role can take into account a person's training status, thus an attribute is reviewed to make the determination of which spaces can be selectable by a particular user, and presented accordingly in according to various embodiments. In addition to role-based access control there can also be attribute-based access control. Further details on attribute-based access control are included in U.S. patent application Ser. No. 16/212,475, filed Dec. 6, 2018. Attributes could include, for example, projects they work on, team memberships, certifications, years of service, and physical location, to name just several possibilities. For a thing (i.e., resource), attributes could be sensitivity level, personally identifying information (PII) status, protected health information (PHI), time-to-live (TTL), or physical location. An attribute, for example, can be having certain specialized training and certification required for accessing certain data. Since everyone can take the training on different dates, no single role can take into account a person's training status. In addition to HIPAA, other security policies may be involved for financial or other sensitive information.

FIG. 6-FIG. 11 illustrate examples user interface screens are shown for various aspects regarding spaces.

Referring back to FIG. 5 which illustrates an example management user interface (UI) 500 for spaces, according to an example embodiment. UI 500 shows the user's default space and other spaces the user can access. In example embodiments, the current space is always visible in the bottom left of the navigation bar. The user can also navigate to the spaces management UI directly from the navigation bar to create a new space. From UI 500, a user can create, edit, and delete spaces. In the example in FIG. 5, UI 500 includes a selectable create space link/button 502 to initiate the creation of a new space. Although links, buttons, or other icons are shown and/or referenced in the examples in the figures, it should be appreciated that voice command or other graphics may be used for a selectable item.

Figure 6:
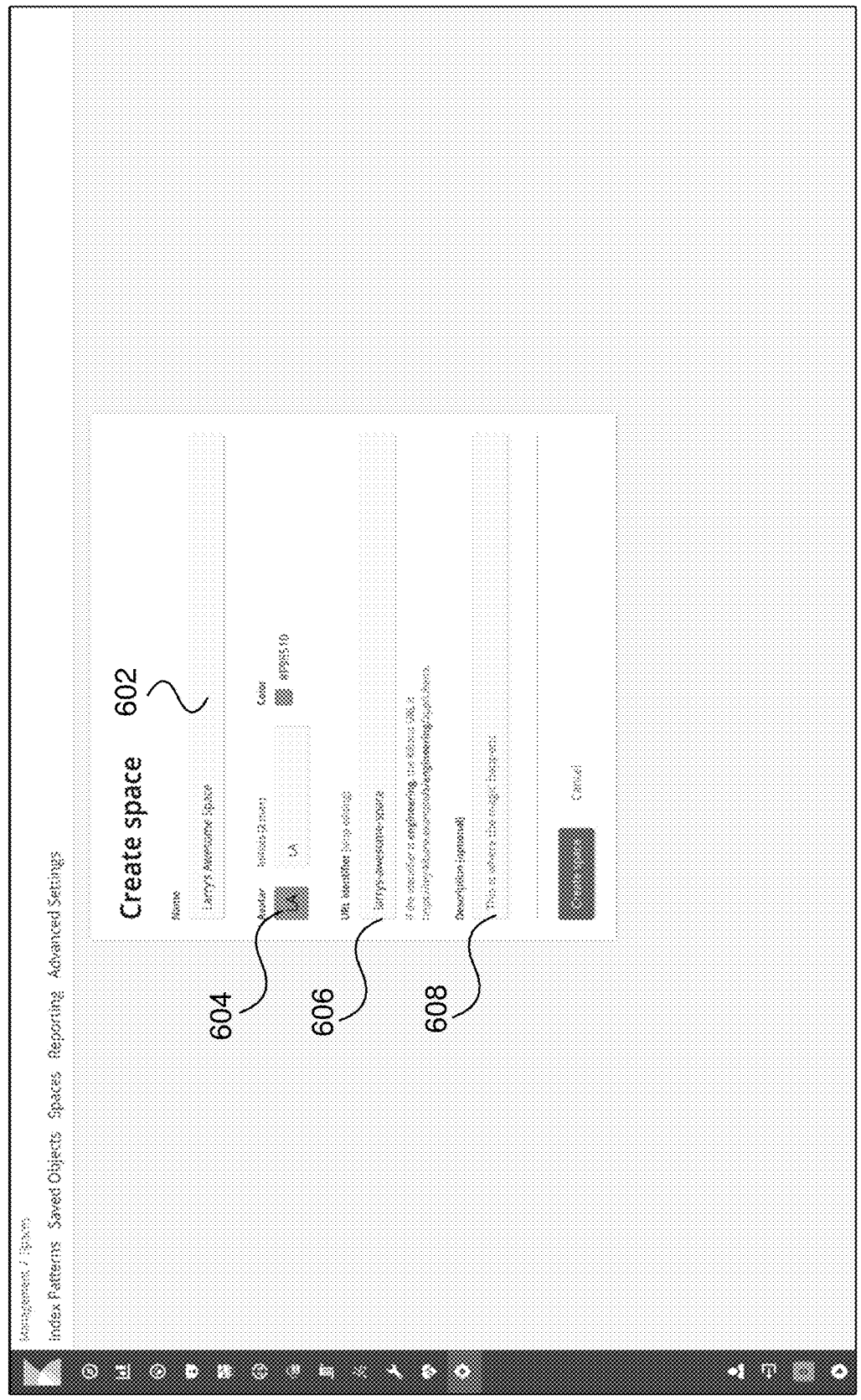
FIG. 6 illustrates an example create space UI for creating a space, according to an example embodiment.

FIG. 6 illustrates an example create space UI 600 for creating a space, according to an example embodiment. This "Create space" UI can provide for adding a name, at 602, for the space. At 604, an avatar can be customized for the new space. A unique URL identifier can be provided at 606, which will display for the browser-based interface for the space. For example, this identifier can become part of KIBANA's URL. In some embodiments, a user can customize the URL when creating a space, but once created, the user may not be allowed to update it. At 608, an optional description can be provided by the user, in this example.

Figure 7:
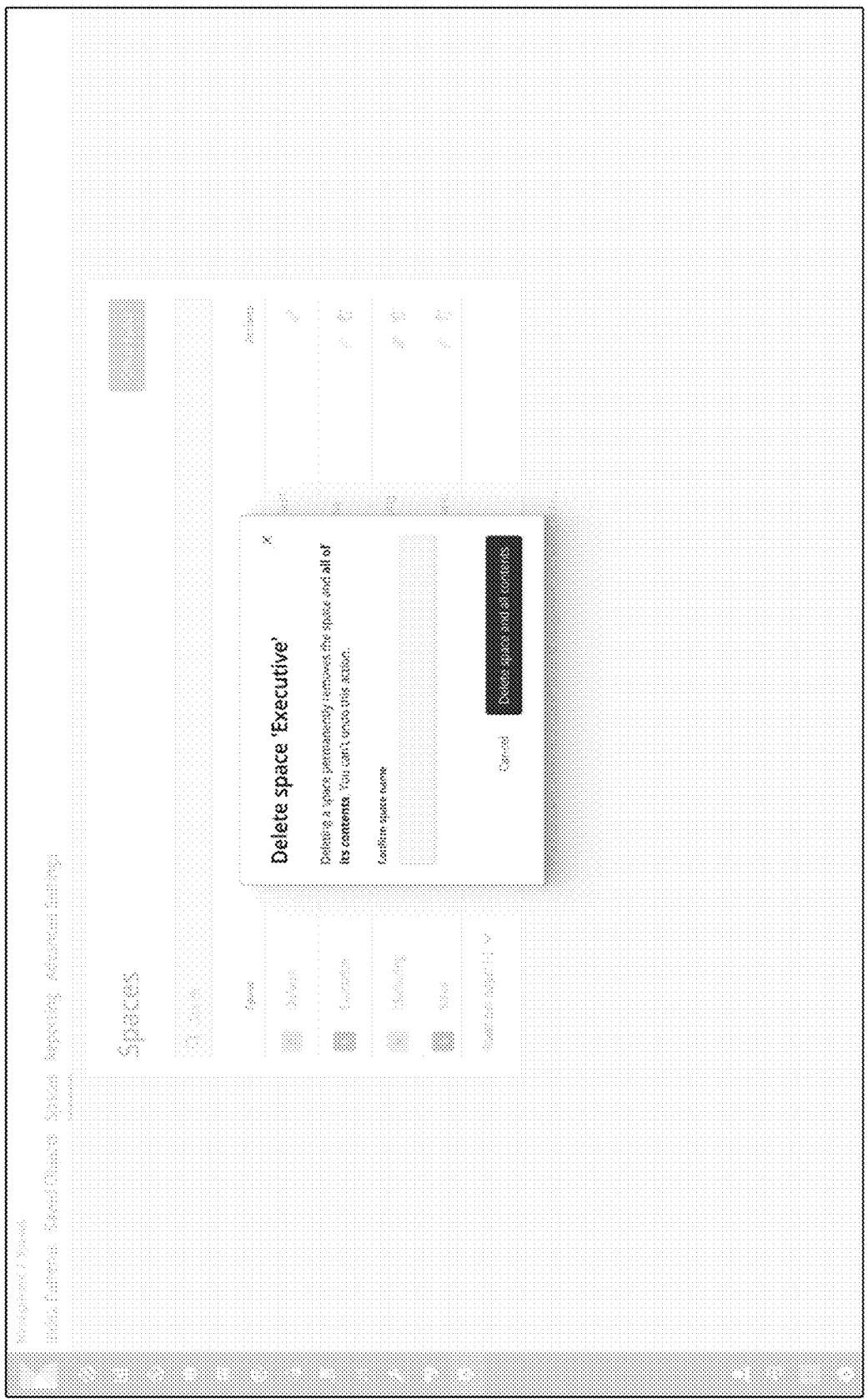
FIG. 7 illustrates an example delete space UI for deleting a space "Executive" and all its contents.

In various embodiments, a user can delete a space if the user has sufficient privileges. FIG. 7 illustrates an example delete space UI 700 for deleting a space "Executive" and all its contents. A confirmation can be required to initiate the deletion.

As discussed herein, a user can move saved objects from one space to another via import/export, if the user has sufficient access.

In some embodiments, the methods and systems enable a user to secure access to spaces, as described further herein. A user may control which roles have access to each space. In other embodiments, the user may control which roles or which attributes have the access. Access to spaces may be governed by a concept called "minimum privilege" with three provided options. In some embodiments, for an "all" minimum privilege setting, users will have read/write access to all spaces (in the platform such as KIBANA, etc.) Additionally, this privilege can enable the user to be able to create, edit, and delete any space, and this can extend to spaces created in the future. In some embodiments, for a "read" minimum privilege setting, users will have read-only access to all spaces, which privilege extends to spaces created in the future. Another minimum privilege can be "none" which indicates that the user cannot access any space. In some embodiments, once a minimum privilege is set, a user can customize access to specific spaces.

Figure 8:
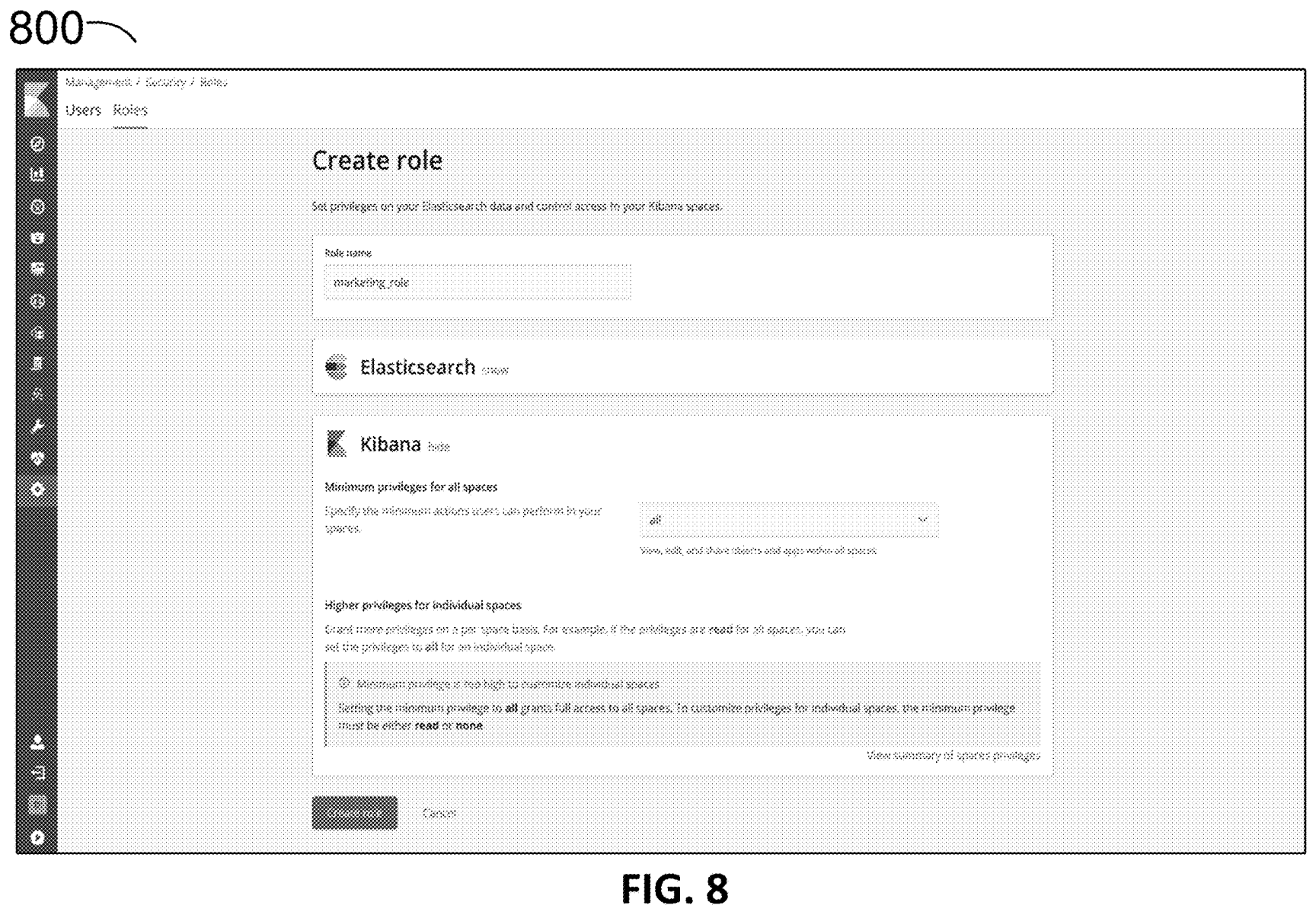

FIG. 8 illustrates an example UI 800 for creating a role with full access to all spaces, according to an example embodiment. In the example in FIG. 8, the user is permitted to set the minimum privilege to "all" while creating the role in order to grant access to all spaces. This particular setting can prevent the user from customizing access on a space by space basis.

Figure 9:
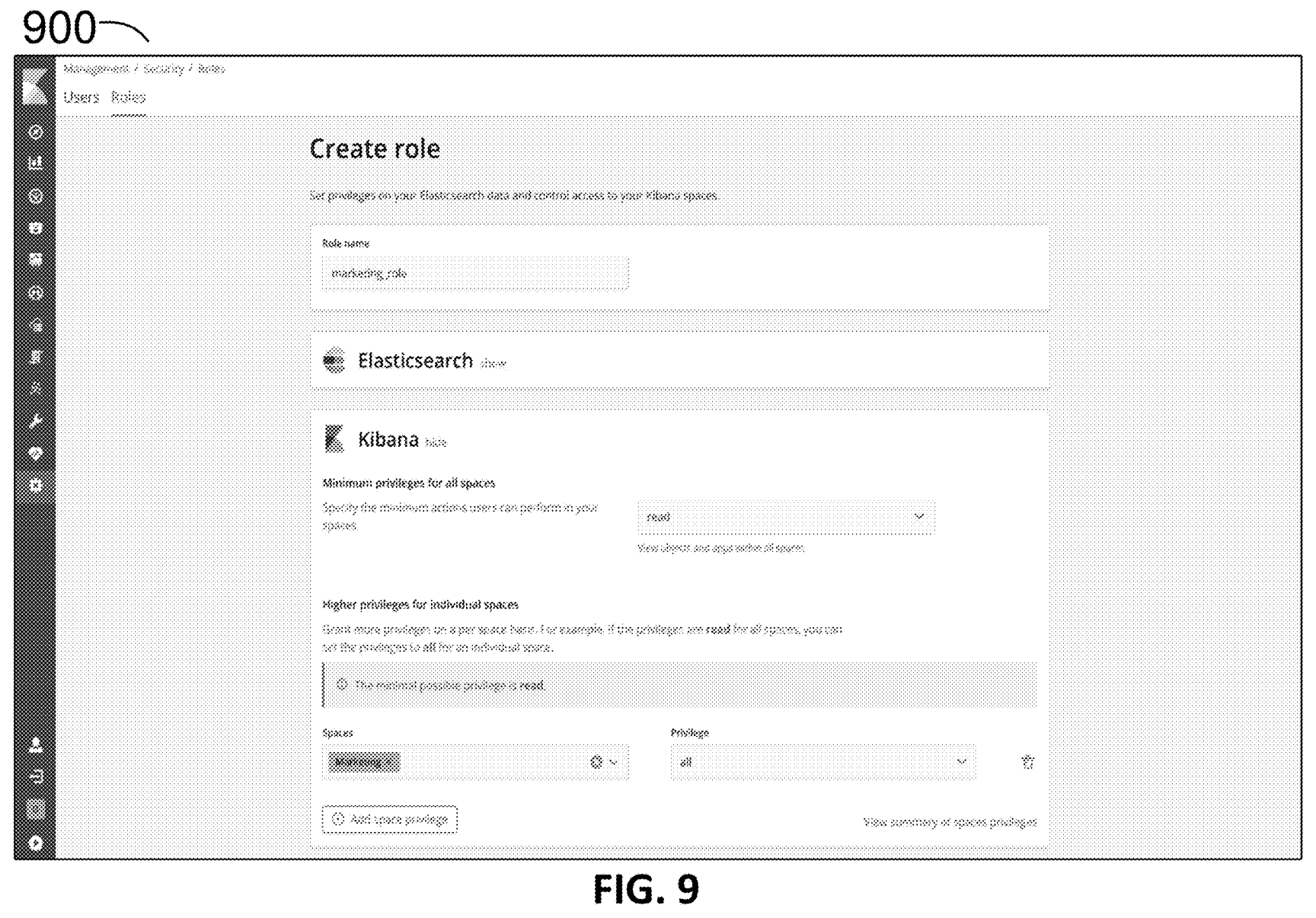

FIG. 9 illustrates an example UI 900 for creating a role with read-only access to all spaces and with full access to only a selected space, according to an example embodiment. In the example in FIG. 9, the user is permitted to set the minimum privilege to "read" while creating the role in order to grant just read-only access to all spaces, and to "all" for the Marketing space to give full access to that space for the new role. This particular combination of settings in the example UI 900 can allow the user to grant "all" access to specific spaces as needed, while not revoking all access to other spaces, instead providing "read-only" access to other spaces.

Figure 10:
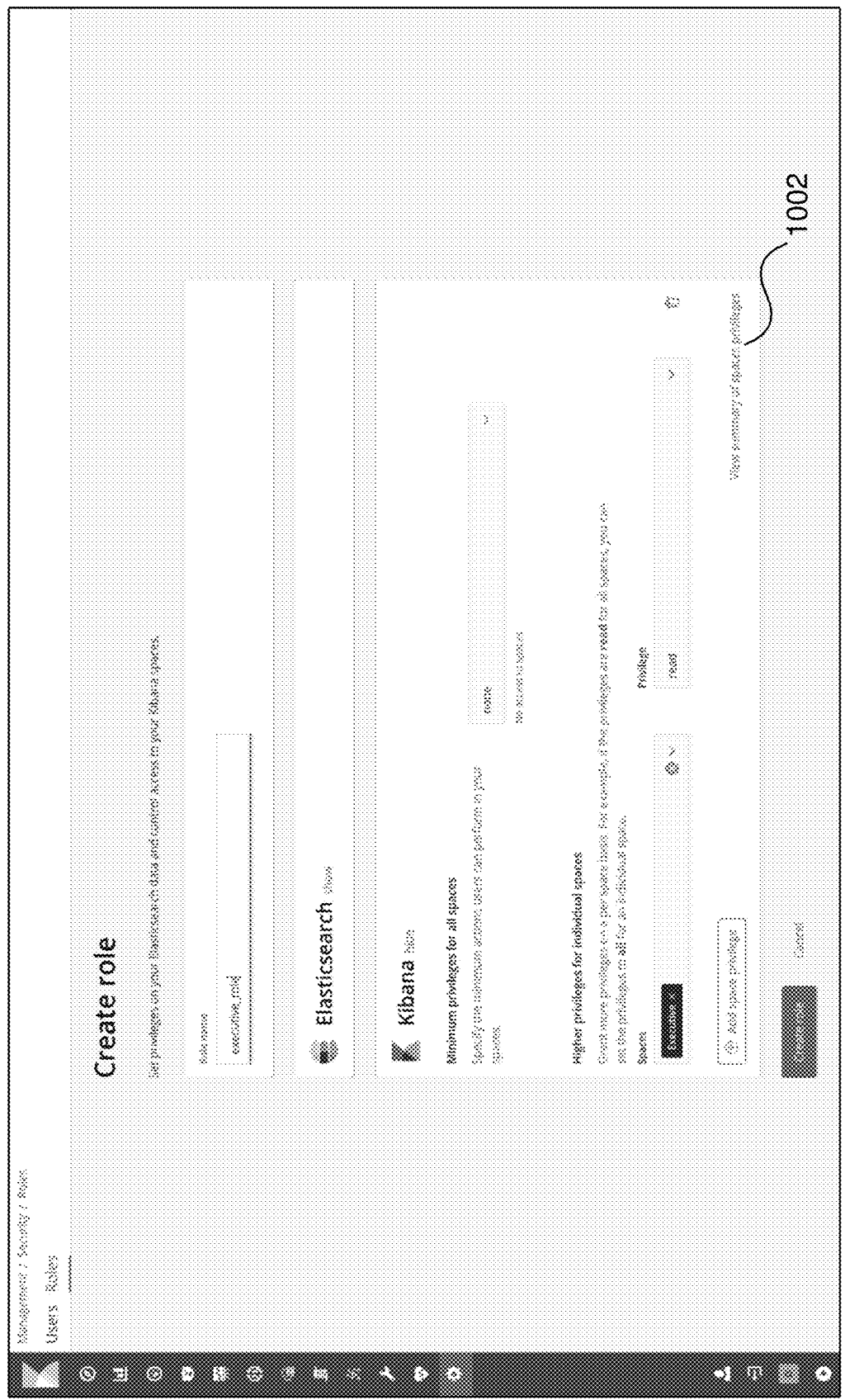
FIG. 10 illustrates an example UI for creating a role with read-only access to only a selected space, according to an example embodiment.

FIG. 10 illustrates an example UI 1000 for creating a role with read-only access to only a selected space, according to an example embodiment. In the example in FIG. 10, the user is permitted, while creating a role, to set the minimum privilege to "none" to prevent access to any space. The UI 1000 example also includes selecting "read" for the Executive space in order to grant just read-only access to that space.

Figure 11:
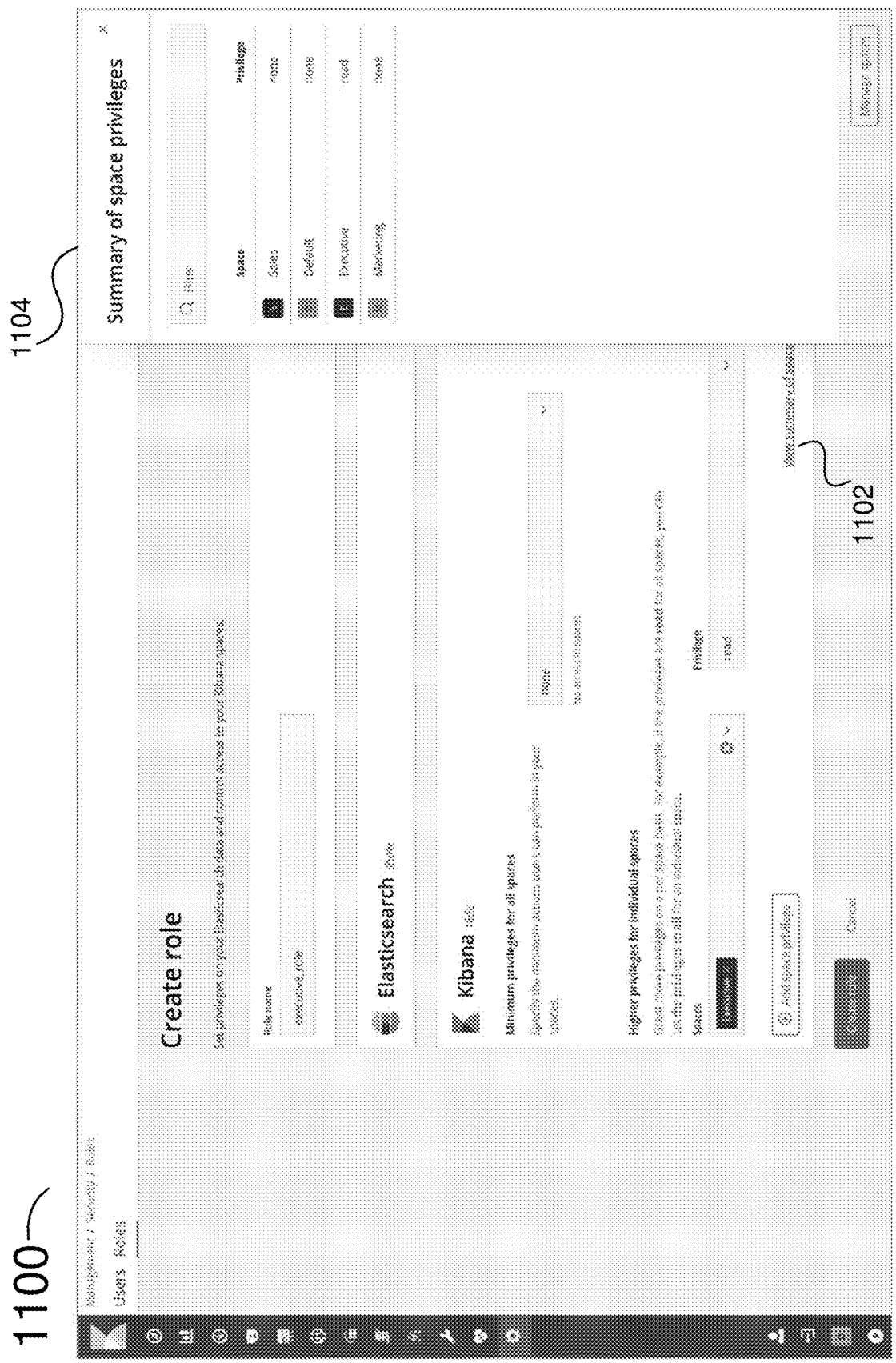
FIG. 11 illustrates an example UI for viewing all space privileges for a certain role name, according to an example embodiment.

FIG. 11 illustrates an example UI 1100 for viewing all space privileges for a certain role name, according to an example embodiment. In the example in FIG. 11, the user is provided with a "view summary of space privileges" link 1102 (shown in its entirety at 1002 in FIG. 10), and in response, the summary of space privileges 1104 is shown to the user, in this example.

FIG. 12 is a simplified flow diagram of a method 1200 for enabling the organizing and controlling of dashboards, visualizations, and other saved data objects into spaces that are containers.

Operation 1202 includes based on at least one role of the user, automatically controlling the user's access to a default space and to other spaces of a plurality of spaces, such that the only spaces that the user can access are the default space and the one or more other spaces, each space containing a number of saved objects. The saved object may be dashboards, visualizations, or other objects, as described further herein Operation 1204 includes providing a user interface for enabling the user to select, as a current space, the default space or one of the one or more other spaces, as described further herein.

Operation 1206 includes, in response to the user selecting the current space, automatically saving new objects generated by the user into the current space, as described further herein.

Operation 1208 includes, wherein each of the one or more other spaces is organized and configured to provide access to certain data objects only or access to certain applications of a plurality of applications only.

Figure 13:
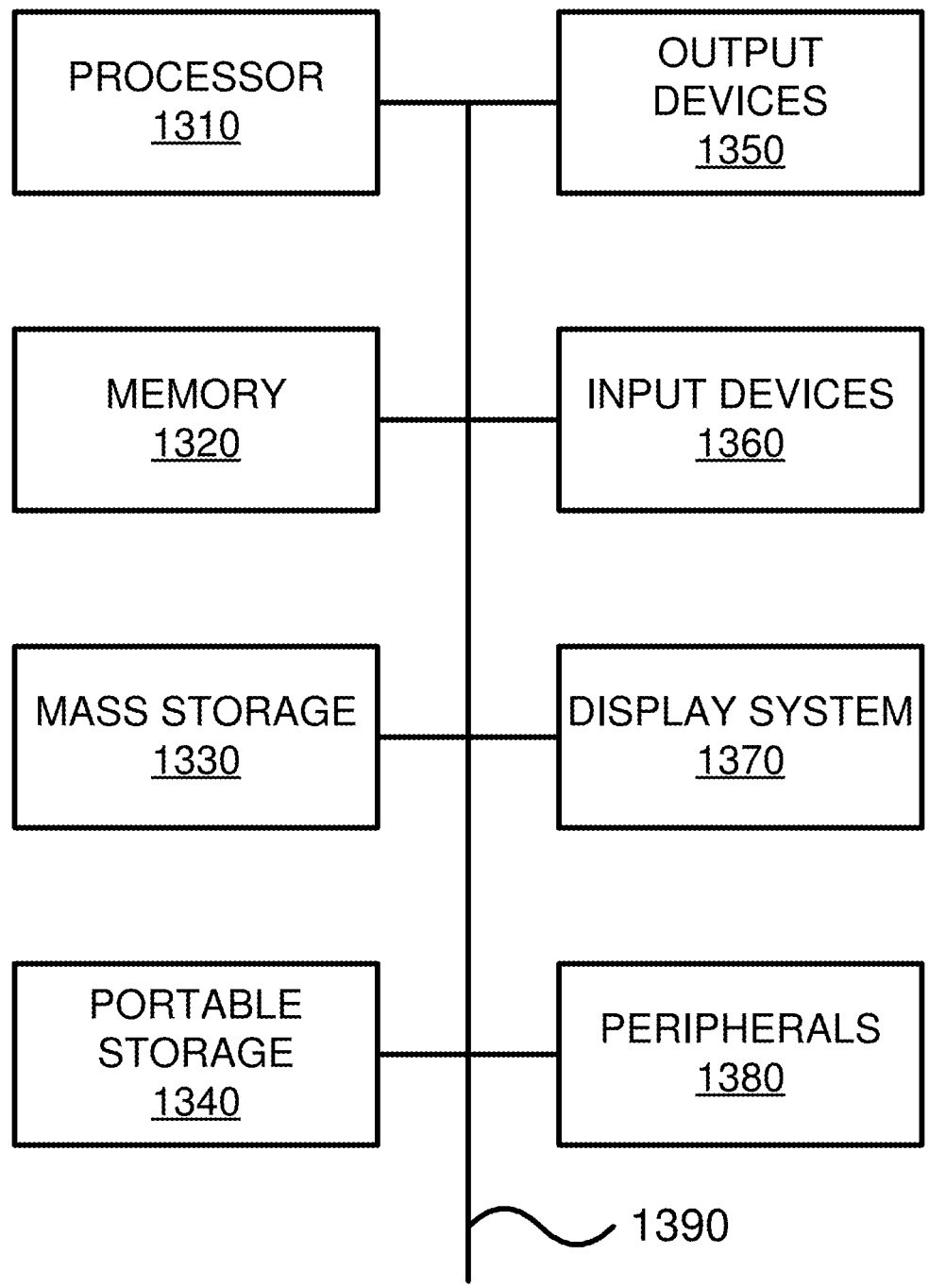
FIG. 13 is a simplified block diagram of a computing system, according to some embodiments.

FIG. 13 illustrates an exemplary computer system 1300 that may be used to implement some embodiments of the present invention. The computer system 1300 in FIG. 13 may be implemented in the contexts of the likes of computing systems, networks, servers, or combinations thereof. The computer system 1300 in FIG. 13 includes one or more processor unit(s) 1310 and main memory 1320. Main memory 1320 stores, in part, instructions and data for execution by processor unit(s) 1310. Main memory 1320 stores the executable code when in operation, in this example. The computer system 1300 in FIG. 13 further includes a mass data storage 1330, portable storage device 1340, output devices 1350, user input devices 1360, a graphics display system 1370, and peripheral device(s) 1380.

The components shown in FIG. 13 are depicted as being connected via a single bus 1390. The components may be connected through one or more data transport means. Processor unit(s) 1310 and main memory 1320 are connected via a local microprocessor bus, and the mass data storage 1330, peripheral device(s) 1380, portable storage device 1340, and graphics display system 1370 are connected via one or more input/output (I/O) buses.

Mass data storage 1330, which can be implemented with a magnetic disk drive, solid state drive, or an optical disk drive, is a non-volatile storage device for storing data and instructions for use by processor unit(s) 1310. Mass data storage 1330 stores the system software for implementing embodiments of the present disclosure for purposes of loading that software into main memory 1320.

Portable storage device 1340 operates in conjunction with a portable non-volatile storage medium, such as a flash drive, floppy disk, compact disk, digital video disc, or Universal Serial Bus (USB) storage device, to input and output data and code to and from the computer system 1300 in FIG. 13. The system software for implementing embodiments of the present disclosure is stored on such a portable medium and input to the computer system 1300 via the portable storage device 1340.

User input devices 1360 can provide a portion of a user interface. User input devices 1360 may include one or more microphones, an alphanumeric keypad, such as a keyboard, for inputting alphanumeric and other information, or a pointing device, such as a mouse, a trackball, stylus, or cursor direction keys. User input devices 1360 can also include a touchscreen. Additionally, the computer system 1300 as shown in FIG. 13 includes output devices 1350. Suitable output devices 1350 include speakers, printers, network interfaces, and monitors.

Graphics display system 1370 include a liquid crystal display (LCD) or other suitable display device. Graphics display system 1370 is configurable to receive textual and graphical information and processes the information for output to the display device. Peripheral device(s) 1380 may include any type of computer support device to add additional functionality to the computer system.

Some of the components provided in the computer system 1300 in FIG. 13 can be those typically found in computer systems that may be suitable for use with embodiments of the present disclosure and are intended to represent a broad category of such computer components. Thus, the computer system 1300 in FIG. 13 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1300 may be implemented as a cloud-based computing environment, such as a virtual machine operating within a computing cloud. In other embodiments, the computing system 1300 may itself include a cloud-based computing environment, where the functionalities of the computing system 1300 are executed in a distributed fashion. Thus, the computing system 1300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1300, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVASCRIPT, JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for providing access controlled spaces configured for data analytics and visualization, the method:
    establishing a default space for a user, the default space being a secure container;
    selecting one or more other spaces for the user from a plurality of spaces;
    based on at least one role of the user, controlling access by a user to the default space and to the one or more other spaces of the plurality of spaces, such that the user can only access the default space and the one or more other spaces;
    automatically placing some or all of the user's saved data objects that existed before the default space was generated, into the default space, the saved data objects being stored in the default space, the saved data objects including configuration data comprising a plurality of index patterns to indicate which search engine indices to explore;
    providing a user interface for enabling the user to select, as a current space, the default space or one of the one or more other spaces, wherein each of the one or more other spaces is associated with a unique identifier, the user interface configured to indicate at least one cluster-wide application outside of the current space available to the user, the at least one cluster-wide application using a plurality of cluster-wide settings and at least one cluster-wide index; and
    in response to the user selecting the current space, automatically saving new objects generated by the user into the current space, each of the new objects comprising the unique identifier of the current space, wherein the saved objects stored in the default space have no identifier to indicate that the saved objects belong in the default space,
    wherein each of the one or more other spaces is organized and configured to provide access to certain data objects only or access to certain applications of a plurality of applications only.

2. The computer-implemented method of claim 1, further comprising automatically generating the default space for a user.

3. The computer-implemented method of claim 1, further comprising generating a dashboard or visualizations, wherein the dashboard or visualizations comprise histograms, line graphs, pie charts, or sunbursts.

4. The computer-implemented method of claim 1, wherein at least some of the plurality of spaces are organized around a common purpose, wherein a plurality of teams belong to the at least some of the plurality of spaces organized around the common purpose.

5. The computer-implemented method of claim 4, wherein the common purpose is a production website.

6. The computer-implemented method of claim 1, wherein at least some of the plurality of spaces are organized around a common purpose and at least some of the plurality of spaces are organized around a particular team of a plurality of teams in a company.

7. The computer-implemented method of claim 6, wherein the plurality of teams comprise engineering, sales, executive, and marketing.

8. The computer-implemented method of claim 1, comprising creating and storing a unique identifier for each space of the plurality of spaces other than the default space.

9. The computer-implemented method of claim 1, further comprising, in response to the user logging in, presenting a user interface that filters the plurality of spaces for showing only ones of the spaces that the user is permitted to access.

10. The computer-implemented method of claim 9, further comprising providing another user interface wherein access to particular ones of the plurality of spaces can be designated as read-only for one or more of the users.

11. The computer-implemented method of claim 10, wherein access to other particular ones of the plurality of spaces can be designated as full access for the one or more of the users via the user interface.

12. The computer-implemented method of claim 1, wherein a particular one of the plurality of spaces that the user can access is determined by selections from an administrator based on the user's roles or attributes for the user.

13. The computer-implemented method of claim 1, wherein each of the plurality of spaces is independent, such that the saved objects unique to one of the spaces do not appear in any of the other ones of the plurality of spaces.

14. The computer-implemented method of claim 1, wherein access is configured such that, if the user does not have access to a particular space of the plurality of spaces, the inaccessible particular space will not be visible or selectable by the user.

15. The computer-implemented method of claim 1, further providing a user interface for selectively deleting a first space of the plurality of spaces, wherein in response to the selectively deleting, cascading the deletion selection to all saved objects within the first space.

16. The computer-implemented method of claim 2, wherein settings from the default space are automatically copied to a new space in response to the new space being created by the user or an administrator.

17. The computer-implemented method of claim 1, comprising providing a user interface for selecting which ones of the plurality of applications are available to ones of the users having access to a particular space of the plurality of spaces.

18. A system comprising:
  a processor; and
  a memory communicatively coupled to the processor, the memory storing instructions executable by the processor to perform a method, the method comprising:
    based on at least one role of a user, automatically controlling access to the user to a default space and to one or more other spaces of a plurality of spaces, such that the only ones of the plurality of spaces that the user can access are the default space and the one or more other spaces, each space of plurality of spaces containing a number of saved objects, the saved objects being a plurality of dashboards, visualizations, or other objects, the default space being a secure container;
    automatically placing and storing some or all of the user's saved data objects that existed before the default space was generated, into the default space, the saved data objects including configuration data comprising a plurality of index patterns to indicate which search engine indices to explore;
    providing a user interface for enabling the user to select, as a current space, the default space or one of the one or more other spaces, wherein each of the one or more other spaces each have a unique identifier, the user interface configured to indicate at least one cluster-wide application outside of the current space available to the user, the at least one cluster-wide application using a plurality of cluster-wide settings and at least one cluster-wide index;
    in response to the user selecting the current space, automatically saving new objects generated by the user into the current space, each of the new objects comprising the unique identifier associated with the current space, wherein the saved objects stored in the default space have no identifier to indicate that the saved objects belong in the default space; and
    wherein each of the one or more other spaces is organized and configured to provide access to certain data objects only or access to certain applications of a plurality of applications only.

19. A system comprising:
  means for, based on at least one role of a user, automatically controlling access by the user to a default space and to one or more other spaces of a plurality of spaces, such that the only ones of the plurality of spaces that the user can access are the default space and the one or more other spaces, each space of the plurality of spaces containing a number of saved objects, the saved objects being a plurality of dashboards, visualizations, or other objects, the default space and the plurality of spaces each being a secure container;
  means for providing a user interface for enabling the user to select, as a current space, the default space or one of the one or more other spaces, wherein each of the one or more other spaces each have a unique identifier, the user interface configured to indicate at least one cluster-wide application outside of the current space available to the user, the at least one cluster-wide application using a plurality of cluster-wide settings and at least one cluster-wide index;
  means for automatically placing some or all of the user's saved data objects that existed before the default space was generated, into the default space, the saved data objects being stored in the default space, the saved data objects including configuration data comprising a plurality of index patterns to indicate which search engine indices to explore; and
  means for, in response to the user selecting the current space, automatically saving new objects generated by the user into the current space; wherein each of the one or more other spaces is organized and configured to provide access to certain data objects only or access to certain applications of a plurality of applications only, and each of the new objects comprising the unique identifier associated with the current space, wherein the saved objects in stored in the default space have no identifier to indicate that the saved objects belong in the default space.

* * * * *